Patented Mar. 19, 1935

1,995,275

UNITED STATES PATENT OFFICE 1,995,275

MANUFACTURE OF CHILL-PROOFED FULL-BODIED ALBUMINOID-CONTAINING FERMENTED BEVERAGES

Herman Heuser, Evanston, Ill., assignor to United States Process Corporation, Chicago, Ill., a corporation of Illinois No Drawing. Application December 5, 1932, Serial No. 645,865

8 Claims. (Cl. 195—4)

My invention relates to the manufacture of chill-proofed full-bodied albuminoid-containing fermented beverages such as beer, which are liable to become hazy or turbid from albuminoid precipitation upon standing at ordinary room temperature, but particularly so, when kept on ice. Beverages of this kind with their albuminoid content fully maintained such as beer, which have not been subjected to the albuminoid precipitation of dealcoholization or alcohol reduction, are especially liable to lose their clear appearance by albuminoid precipitation in the trade containers.

In order to prevent albuminoid precipitation in beverages of the type of beer, these beverages are customarily treated by proteolytic enzymes or tannin, the treatment by proteolytic enzymes changing the albuminoids of the beverage to less precipitable albuminoids and the treatment by tannin removing the precipitable albuminoids from the beverage. In either case, the quality of the beverage suffers, particularly the foam-holding capacity and the full bodiness of the beverage, because the same depend mainly upon the higher molecular or precipitable albuminoids thus changed or removed by the aforesaid treatments.

The treatment of a beverage such as beer by proteolytic enzymes to keep it clear has the further serious disadvantage that the material containing the proteolytic enzyme always contains some lipase, which saponifies or removes the esters, the flavor and aroma substances of beer, more or less in proportion to the amount of lipase contained in the proteolytic enzyme material, such as, for example, commercial pepsin or papain.

As it is inadvisable to change or precipitate in a beverage of the beer type all the precipitable albuminoids for the reason that the beverage would lose practically all of its foam-holding capacity and most of its full bodiness, the customary methods for preventing albuminoid precipitation are necessarily only partially effective in keeping the beverage clear in the trade containers.

I have discovered that the presence of a proteolytic enzyme anti-body in an albuminoid-containing beverage such as beer, will keep the unpasteurized and pasteurized beverage clear in the trade containers for an unusually long period of time. This effect by a proteolytic enzyme anti-body is due to its very nature, which prevents proteolytic changes, prevents a reversion of the albuminoids to insoluble albuminoids and a conversion of the albuminoids to simpler, less full-bodied albuminoids, and thus prevents the beer from becoming less foam-producing and less full-bodied.

Hydrolytic agents, such as proteolytic enzymes, not only hydrolyze or convert albuminous substances into their components, they also are able to build up from these components the original substances. The proteolytic enzyme anti-bodies prevent such conversion and reversion, and therefore, when they are present in a fermented albuminoid containing beverage, they stabilize the albuminoid content of the beverage. By thus stabilizing the albuminoid content of the clear beverage, the beverage keeps up its clear appearance at ordinary room temperature and upon ice for unusually long periods of time without detriment to its foam-producing capacity and its full bodiness. The result may be accomplished by the proteolytic enzyme anti-body in a body free from proteolytic enzymes, or by an excess of proteolytic enzyme anti-bodies in a body containing proteolytic enzymes.

For carrying out my invention, I prefer to employ as anti-bodies the anti-protease of yeast. The same is loosely associated with the proteolytic enzymes of yeast, collectively termed protease. I dissociate the anti-protease from the protease by exposing the yeast to heat of such a high temperature as will precipitate or kill the protease, and as will kill at the same time the lipase contained in the yeast, but will not precipitate the highly thermo-stable anti-protease, the removal of the lipase being necessary for preventing the saponification or destruction by the lipase of the dissociated anti-protease, a saponifiable ester of phosphoric acid, the removal of the lipase being likewise necessary for preventing the destruction of the flavor and aroma-bearing esters contained in the beverage, to which the killed yeast is to be added.

Thus, I add the yeast to sufficiently hot water, such as boiling or boiling hot water, in which the anti-protease remains unprecipitated because of its high thermo-stability, and in which the protease, with which anti-protease is loosely associated, is precipitated or killed, the lipase and the other yeast enzymes being likewise precipitated or killed, the thermo-stable anti-protease thus dissociated from the protease diffusing into the water.

By "killed" as used herein is meant that the yeast has been so treated as to have its proteolytic enzymes substantially destroyed, while its proteolytic enzyme anti-bodies are substantially unimpaired.

In the following, I will describe a process suitable to carry out my invention in the manufacture of albuminoid-containing beverages of the type of beer.

Beer wort is produced from the usual brewing materials by the usual mashing and hopping. After the hopped wort has been cooled and pitched with the usual quantity of yeast, which is 100 pounds of thick fluid brewers yeast for 100 barrels of wort, the wort is fermented in the usual way. The fermented wort or beer is withdrawn from the settled out yeast and put on storage, while the yeast crop is put aside. The portion of the yeast crop to be used for pitching is kept at a suitably low temperature in the customary yeast containers.

The remaining larger portion of the yeast crop is kept in separate containers preferably placed in a special room. Here the yeast, fresh or liquefied or digested, is exposed to the effect of heat, sufficiently high in temperature to kill the enzymes of the yeast with the exception of the anti-protease. Thus, for example, 250 pounds of thick fluid or fresh yeast, are added to and mixed with 5 barrels of boiling hot water having a temperature of say 97° C. and kept therein, until the yeast is killed. An exposure of the yeast to the boiling hot water lasting say for 10 to 20 minutes is sufficient to kill the protease of the yeast, whereby the anti-protease is dissociated, and further is sufficient to kill the lipase of the yeast, whereby saponification of the dissociated anti-protease is prevented. At the same time, any other enzyme such as the diastase contained in the yeast, is killed, whereby other detrimental changes in the composition of the beverage are prevented. As a result of the treatment, the anti-protease is extracted into the water. In normal yeast, the anti-protease is held within the cell walls.

The anti-protease-containing killed yeast is run into 100 barrels of the fermented wort or beer having a temperature of say 2° C. preferably, while the beer is being stirred by mechanical means, the anti-protease liquid being cooled during its passage into the beer by a pipe cooler to the temperature of the beer. The anti-protease liquid may be also introduced into the beer hot. As the rise in temperature of the beer resulting from the hot introduction of the anti-protease liquid is only small, usually about 4 to 6° C., the temperature of the refrigerated storage room or cellar is usually sufficient to cool the beer to its former temperature, especially, when the beer thus treated is contained in steel tanks.

In case of the employment of digested yeast for the preparation of the anti-protease containing killed yeast, great care has to be taken that the digestion of the yeast does not go so far as to impart to the yeast a meaty taste and smell, which are very objectionable, as they would be imparted to the beer by the killed yeast.

After the addition of the anti-protease, the beer is carbonated, when it is sufficiently cold, and thereupon it is filtered clear and filled into the trade containers. However, it may be stored, until the insoluble portion of the killed yeast has settled out of the beer, whereupon it is carbonated, filtered to clearness and filled into the trade containers. The anti-protease may be also added to beer already carbonated, and when this is done, the carbonation of the beer is, of course, omitted in the preparatory steps to make the beer ready for the market.

While I have employed the yeast in a proportion of 250 pounds of thick fluid yeast to 100 barrels of beer, I may also employ the yeast in a somewhat smaller or larger proportion without changing the results obtained by my invention, and while I have employed hot water to kill the yeast, I may employ any other suitable liquid heated sufficiently to kill the yeast without killing the anti-protease of the yeast, and while, I have employed heat to kill the yeast, I may employ any other means for killing the yeast and extracting the anti-protease from the yeast, and further while I have added the anti-protease liquid to the beer in an unfiltered condition with the killed yeast cells contained in the liquid, I may add it to the beer in a clarified or filtered condition.

Instead of yeast anti-protease, I might have also employed any other proteolytic enzyme antibody, thermo-stable at least up to the pasteurizing temperature of the albuminoid-containing fermented beverage, to carry out my invention.

The present method of keeping an albuminoid-containing beverage clear by means of proteolytic enzyme anti-bodies is just the reverse of keeping an albuminoid-containing beverage clear by proteolytic enzymes. The proteolytic enzyme anti-body fixes or stabilizes the albuminoid content of the beverage, while the proteolytic enzyme changes the albuminoid content of the beverage.

The fermented beverage thus produced keeps clear for unusually long periods of time upon standing at room temperature or when kept on ice without loss in foam-producing capacity and full bodiness because of the anti-protease contained in it, which stabilizes the albuminoid content of the beverage, and also without loss in esters because of the absence of lipase.

The term "killed yeast" in the following claims shall mean yeast, in which the enzymes have been killed with particular reference to the protease and lipase of the yeast, but which contains the proteolytic enzyme anti-bodies of the yeast, collectively termed anti-protease.

The foregoing detailed description has been given for clearness of understanding only, and no unnecessary limitations should be understood therefrom, but the appended claims should be construed as broadly as permissible, in view of the prior art.

I claim:

1. The method of chill-proofing beer originally containing proteolytic enzymes derived from yeast fermentation which comprises the adding of anti-protease of yeast thereto in an amount sufficient to neutralize all proteolytic enzymes present immediately after such addition, while maintaining the beer substantially free from lipase whereby the albuminoid content of the beer is stabilized against reversion and conversion.

2. The method of chill-proofing albuminoid-containing yeast-fermented beverages, in which proteolytic enzymes are present, which comprises adding proteolytic enzyme anti-bodies thereto in an amount sufficient substantially to neutralize all proteolytic enzymes present immediately upon such addition, while maintaining the beverage substantially free from lipase, whereby reversion of the albuminoid content into precipitable form is substantially prevented.

3. The method as set forth in claim 2 in which the proteolytic enzyme anti-bodies are the anti-protease of yeast.

4. The method as set forth in claim 2 in which the introduction of proteolytic enzyme anti-bodies is accomplished by the addition of killed yeast.

5. The method as set forth in claim 2 in which the beverage is beer.

6. As an article of commerce, a yeast-fermented cereal beverage containing proteolytic enzymes and containing the albuminoids produced by fermentation, substantially free from lipase, and containing an excess of proteolytic enzyme anti-bodies over the quantity required to neutralize the proteolytic enzymes in the beverage.

7. An article as set forth in claim 6 in which the proteolytic enzyme anti-bodies are the anti-protease of yeast.

8. An article as set forth in claim 6 in which the beverage is beer.

HERMAN HEUSER.